US012715029B2

(12) United States Patent
Larikka

(10) Patent No.: US 12,715,029 B2
(45) Date of Patent: Aug. 25, 2026

(54) METHOD AND DEVICE FOR PERFORATING A PIPE WALL

(71) Applicant: Leo Larikka, Vantaa (FI)

(72) Inventor: Leo Larikka, Vantaa (FI)

(73) Assignee: T-DRILL OY, Laihia (FI)

(*) Notice: Subject to any disclaimer, the term of this patent is extended or adjusted under 35 U.S.C. 154(b) by 404 days.

(21) Appl. No.: 18/267,831

(22) PCT Filed: Dec. 20, 2021

(86) PCT No.: PCT/FI2021/050899
§ 371 (c)(1),
(2) Date: Jun. 16, 2023

(87) PCT Pub. No.: WO2022/152965
PCT Pub. Date: Jul. 21, 2022

(65) Prior Publication Data

US 2024/0109117 A1 Apr. 4, 2024

(30) Foreign Application Priority Data

Jan. 15, 2021 (FI) ..................................... 20217012

(51) Int. Cl.
*B21D 28/28* (2006.01)
*B21C 37/29* (2006.01)
(Continued)

(52) U.S. Cl.
CPC ............ *B21D 28/28* (2013.01); *B21C 37/292* (2013.01); *B21D 28/34* (2013.01); *F16L 41/001* (2013.01)

(58) Field of Classification Search
CPC ........ B21D 28/28; B21D 28/34; B21D 45/02; F16L 41/001; F16L 41/00
(Continued)

(56) References Cited

U.S. PATENT DOCUMENTS 3,698,274 A 10/1972 Coulon
6,128,991 A 10/2000 Nakagawa et al.

FOREIGN PATENT DOCUMENTS

CN 104475546 A * 4/2015 ............. B21D 28/28
JP H11244957 * 9/1999
(Continued)

OTHER PUBLICATIONS

Translation JPH11244957 (Year: 2026).*
(Continued)

*Primary Examiner* — Nhat Chieu Q Do
(74) *Attorney, Agent, or Firm* — Renner, Kenner, Greive, Bobak, Taylor & Weber Co. LPA

(57) ABSTRACT

A method and device for perforating a pipe wall. In the method, the pipe is moved in its longitudinal direction to a punching position comprising a cutting punch (2) and a three-part die (3, 5, 8) inside the pipe. The die (3, 5, 8) is expanded in the direction of movement of the cutting punch by means of the wedge surfaces (*8a*,*8b*) of a wedge (8) between the die parts (3, 5) by moving the wedge (8) in a first direction of transfer towards the free end of the die. The cutting punch (2) is used to punch a hole in the pipe wall, which is supported by an expanded die (3, 5, 8) during punching, whereupon the piece punched off from the pipe falls into the hole (16) of the upper die part (3). The die is contracted by moving the wedge (8) in a second direction of transfer by a first transfer distance. The die parts (3, 5) then turn in an articulated manner towards each other and out of contact with the inner surface of the pipe. The perforated pipe is moved away from the punching position in its longitudinal direction and the pipe is moved to a position for finishing the rims of the hole. The lower die part (5) and the wedge (8) are further moved together in a second direction of transfer by a second transfer distance, whereupon the base
(Continued)

of the hole (16) opens and the piece punched off from the pipe falls through the hole (16).

6 Claims, 2 Drawing Sheets

(51) Int. Cl.
*B21D 28/34* (2006.01)
*F16L 41/00* (2006.01)

(58) Field of Classification Search
USPC .......................................................... 83/188
See application file for complete search history.

(56) References Cited

FOREIGN PATENT DOCUMENTS

| | | | | |
|---|---|---|---|---|
| JP | H11244957 | A | | 9/1999 |
| JP | 2012024768 | A | * | 2/2012 |
| JP | 2016022517 | A | * | 2/2016 |
| WO | 2006095754 | A1 | | 9/2006 |

OTHER PUBLICATIONS

Translation JP-2012024768-A (Year: 2026).*
Finnish Patent Office Search Report dated Aug. 13, 2021 from counterpart priority application (1 page).
Extended European Search Report dated Oct. 4, 2024 for corresponding European Regional Phase of International Application PCT/FI2021/050899 (4 pp).

* cited by examiner

METHOD AND DEVICE FOR PERFORATING A PIPE WALL

FIELD OF THE INVENTION

The object of the present invention is to provide a method and device for efficiently producing a pilot hole which meets collaring requirements as an initial process stage of a collaring process. The method and device according to the invention must be applicable especially for perforating round pipes without deforming, scratching or otherwise damaging the pipe.

BACKGROUND OF THE INVENTION

From the patent publication U.S. Pat. No. 6,128,991 is known a method and device for perforating a pipe with a rectangular cross-section by punching. By means of the moving die part of a two-part die, the pipe is positioned on the centre line with respect to the cutting punch part by expanding the die in the lateral direction against the side walls of the pipe.

From the publication JPH 11244957 A is also known a method and device for perforating a pipe with a rectangular cross-section by punching. In it, a three-part die is expanded in the direction of movement of the cutting punch against the inner surfaces of the pipe by moving the middle die part, the wedge surfaces on the lower surface of which cooperate with the wedge surfaces on the upper surface of the lowest die part. The topmost die part is attached to the body and the lowest die part is supported by a pivoted shaft on the base of the topmost die part. Below the die, the lower surface of the pipe is supported on the body for receiving the punching force of the cutting punch. The reciprocating movements of the middle die part serve the expansion of the die and the distance of travel is limited to the operating area of the wedge surfaces. The piece punched off from the pipe first falls against the inner surface of the pipe and may scratch the inner surface of the pipe when the pipe is pulled out. In addition, the die parts drag along the inner surface of the pipe when the pipe is pushed into the punching position and pulled out of it. This may also scratch the inner surface of the pipe.

When a cylinder, or collar, branching from the pipe wall is made in the pipe by stretching the wall material of the pipe, on the wall must first be made a suitable pilot hole from the rims of which the desired cylinder or collar can be stretched. The hole must be of such quality that its rim withstands stretching (so-called collaring) to form the desired collar.

The quickest known way of making holes in relatively thin walls is by punching. However, punching does not produce sufficiently high quality for stretching a branching cylinder or collar. When stretched, the material rips on the rim of a hole made by punching.

Another known way of making a high-quality hole for collaring purposes is to machine the hole by milling. From the point of view of production, milling is a slow way of making a hole of the desired shape because it requires chipping a large amount of material.

In the present invention, these two known perforating methods are combined by first making a pilot hole by punching and then finishing the pilot hole by milling. For this purpose, in the present invention has been developed a quick and efficient method and device for making a hole by piercing, or punching.

SUMMARY OF THE INVENTION

A method for perforating a pipe wall with a punch comprising a body, a cutting punch and a three-part die with an upper die part, a lower die part and a wedge between the die parts, the method comprising the following stages:

- moving the pipe in its longitudinal direction to a punching position where the die is inside the pipe,
- expanding the die in the direction of movement of the cutting punch by moving the wedge in a first direction of transfer towards the end of the die,
- perforating the wall of the pipe with a cutting punch while supporting the wall with an expanded die during punching, whereupon the piece punched off from the pipe falls into a hole in the upper die part,
- contracting of the die by moving the wedge in a second direction of transfer opposite to the first direction of transfer,
- moving the perforated pipe away from the punching position in its longitudinal direction and
- moving the pipe to a position for finishing the rims of the hole.

A device for perforating a pipe wall, the device comprising a body, a cutting punch arranged to reciprocate with respect to the body and having the shape and size of the desired hole, an elongated die supported on the body by means of a support bushing and having a free end, the die comprising an upper die part with a hole corresponding to the shape and size of the cutting punch, and a lower die part as well as a wedge between the die parts, which can be reciprocated by a first power unit to expand and contract the die.

BRIEF DESCRIPTION OF THE DRAWINGS

An embodiment of the invention is described in the following with reference to the accompanying drawings in which.

DETAILED DESCRIPTION OF ILLUSTRATIVE EMBODIMENTS

Figure 3:
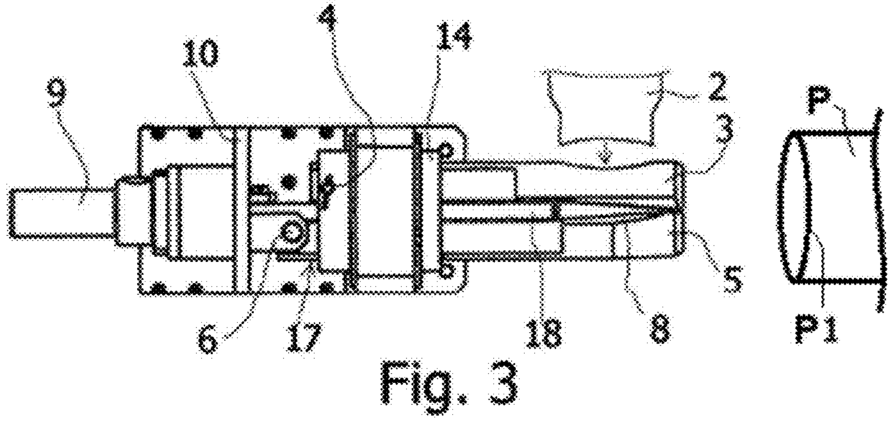
FIG. 3 shows a side view of the device according to FIGS. 1 and 2.
Figure 2:
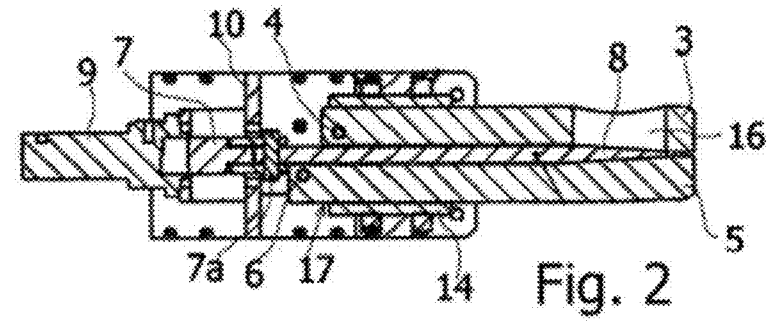
FIG. 2 shows a section of FIG. 1 along line II-II.
Figure 1:
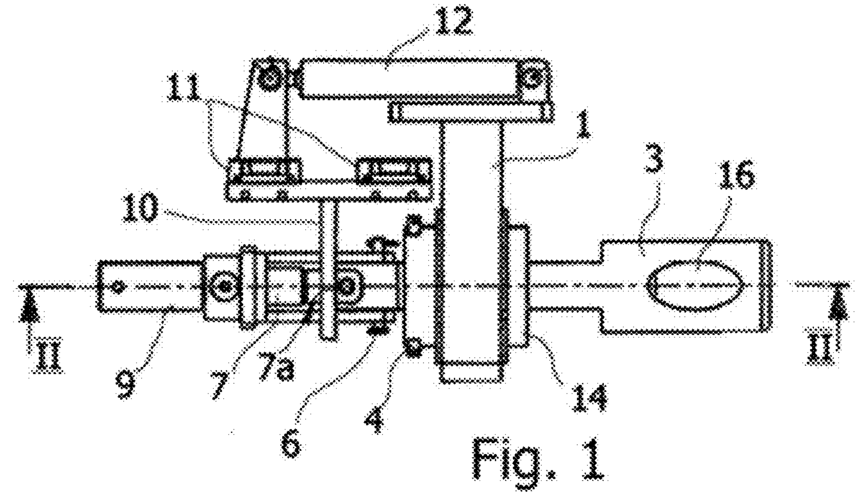
FIG. 1 shows a top view of the perforating device according to the invention.

The device comprises a body 1 and a cutting punch 2 which is arranged to reciprocate with respect to the body and the cutting punch blade of which has the shape and size of the desired hole. An elongated die 3, 5, 8 is supported on a support bushing 14 attached to the body 1, from which support bushing the die 3, 5, 8 projects. The die 3, 5, 8 has a free end from the direction of which the pipe to be perforated can be pushed around the die. The die 3, 5, 8 comprises an upper die part 3 with a hole 16 corresponding to the shape and size of the cutting punch, and a lower die part 5 as well as a wedge 8 between the die parts, which can be reciprocated in the longitudinal direction of the die by a first power unit 9 to expand and contract the die.

The pipe P, including pipe wall P1, to be perforated is moved in its longitudinal direction to the punching position such that the three-part die 3, 5, 8 is pushed inside the pipe P. The upper die part 3, which is the die part on the cutting punch 2 side, is attached to the support bushing 14 by means of a swivel joint 4 which allows the turning movement of the upper die part 3 in the direction of movement of the cutting punch 2 within the limits allowed by the support bushing 14 and the wedge 8. Due to this articulated support, the cutting punch side of the upper die part 3 is positioned inside the inner surface of the moving pipe at the pipe pushing stage without touching the inner surface of the pipe.

Figures 4, 5, 6A, 6B, 7A, 7B:
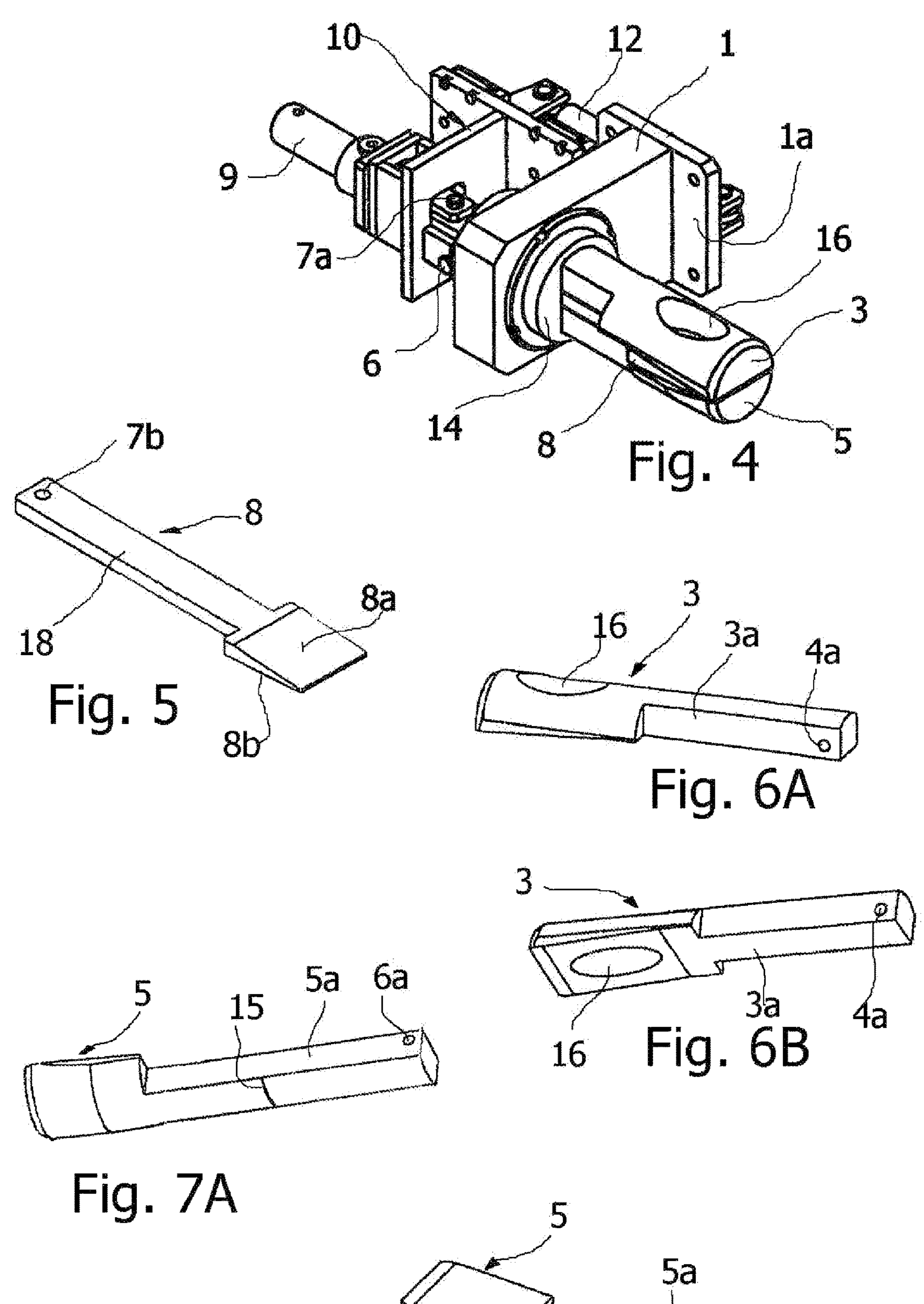
FIG. 4 shows a diagonal top view of the same device.
FIG. 5 shows a diagonal top view of the wedge.
FIGS. 6A and 6B show the upper die part diagonally from above and below.
FIGS. 7A and 7B show the lower die part diagonally from below and above.

As can be seen in FIGS. 6A and 6B, the upper die part 3 comprises an arm 3*a* with a hole 4*a*. The swivel joint 4 consists of a cotter bolt which penetrates the hole 4*a*. This means that the die part 3 can be easily replaced by another with a similar arm 3*a* but with an actual die part 3 adapted in size to the desired pipe diameter and hole size.

The lower die part 5 is attached to a carriage 10 moved by a second power unit 12 by means of a swivel joint 6 which allows the turning movement of the lower die part 5 in the direction of movement of the cutting punch 2 within the limits allowed by the support bushing 14 and the wedge 8.

As can be seen from FIGS. 7A and 7B, the lower die part 5 comprises an arm 5*a* which has a hole 6*a*. The swivel joint 6 consists of a cotter bolt which penetrates the hole 6*a*. The die 6 can thus easily be replaced by another with a similar arm 6*a* but with an actual die part 5 adapted in size to the desired pipe diameter and hole size.

As shown in FIG. 5, the wedge 8 has wedge surfaces 8*a*, 8*b* on both sides which turn both die parts 3, 5 away from each other in an articulated manner to expand the die when the first power unit 9 moves the wedge 8 towards the free end of the die 3, 5, 8. The wedge 8 comprises an arm 18 with a hole 7*b* penetrated by the cotter bolt 7*a* with which the moving part 7 (such as the piston rod 7 of a piston type cylinder device) of the power unit 9 is attached to the wedge 8 arm 8*a*. In this case also the wedge 8 can easily be replaced in connection with the replacement of the dies 3 and 5. The support bushing 14 does not need to be replaced when the size and shape of the arms 3*a*, 5*a* and 18 of the die parts and the wedge remain constant.

The first power unit 9 is adapted to move the wedge 8 by a first transfer distance in the contracting direction. The second power unit 12 is adapted to move the lower die part 5 and the wedge 8 together by a second transfer distance, which is an extension of the first transfer distance. Due to the second transfer distance, the base of the hole 16 of the upper die part 3 opens and the piece punched off falls. Before this, the die had been contracted and the pipe had been removed from around the die and thus the fallen piece did not scratch the inner surface of the pipe.

Arrow 17 marks a power unit, such as a spring which turns the lower die part 5 upwards with respect to the swivel axis formed by the swivel joint 6 as the wedge 8 is moved backwards, that is, in the direction of contraction. Thus, the lower die part does not drag along the inner surface of the pipe either when the perforated pipe is pulled away from the punching position. The upper die part 3 turns downwards due to gravity when the die part contracts.

On the lower surface of the lower die part 5 is a threshold 15 which is adapted to rest against the support bushing 14 at the beginning of the said second transfer distance and to turn the lower die part 5 upwards or to support the lower die part 5 in the already upwards turned position to which the spring 17 has turned the die part 5.

The first power unit 9 is preferably a piston type cylinder device, the cylinder of which is attached to a carriage 10 and the piston rod 7 is attached with a cotter bolt 7*a* to the wedge 8. The piston rod 7 and the cotter bolt 7*a* are able to move through the carriage 10 opening. The second power unit 12 is preferably also a piston type cylinder device, the cylinder of which is attached to the body 1 and the piston rod is attached to the carriage 10.

In the embodiment shown, on the lower surface of the upper die part 3 is a wedge surface which slopes downwards towards the free end of the die, whereupon the upper die part 3 thickens towards its end. The upper surface of the lower die part 5 slopes upwards, whereupon the lower die part 5 thickens towards its free end. The wedge angle of the wedge surfaces of the die parts 3, 5 is the same as the wedge angle of the wedge surfaces of the wedge 8. This provides as large as possible wearing surfaces and a solid die.

The direction of movement of the carriage 10 and correspondingly the direction of movement of the wedge 8 and the lower die part 5 is the same as the direction of movement of the pipe and the axial direction. The wedge 8 is on the centre line of the die and causes the symmetrical expansion of the die 3, 5, 8 in the direction of movement of the cutting punch when the power unit 9 moves the wedge 8 towards the free end of the die.

The cutting punch 2 is used to punch a hole in the pipe wall, which is supported by an expanded die 3, 5, 8 during punching. The piece punched off from the pipe falls into the hole 16 of the upper die part 3. The piece must not fall inside the pipe and drag along the inner surface of the pipe or follow the pipe when the perforated pipe moves to the next working stage. The perforated pipe is moved in its longitudinal direction away from the punching position and the pipe is moved to the hole rim finishing position in which the rim of the hole cut by the cutting punch is finished (by chipping) with a rotating blade, the movement of which follows the shape of the punched hole. The shape of the hole is more or less oval when the hole is made in the wall of a round pipe for making a branch collar. In this case, also the curvature of the cross-section of the upper and lower surface of the die 3, 5, 8 corresponds to the curvature of the inner surface of the round pipe. The width of the die is slightly smaller than the cross-section of the pipe.

Before punching the hole, the die 3, 5, 8 is expanded in the direction of movement of the cutting punch 2 by means of the wedge surfaces 8*a*, 8*b* of the wedge 8 by moving the wedge 8 in the first direction of transfer (towards the free end of the die) with respect to the die parts 3 and 5. During the transfer movement of the wedge 8 and the expansion of the die 3, 5, 8, the die 3, 5, 8 is supported in the support bushing 14 from which the die 3, 5, 8 extends outside the support bushing 14. At the end of the transfer movement of the wedge the wedge surfaces 8*a* and 8*b* expand the die by turning the upper part and lower part of the die into contact with the inner surface of the pipe. During punching, the punching force is transmitted by means of the die 3, 5, 8 to the support structures (not shown) on the other side of the pipe without flattening the pipe.

After punching, the wedge 8 is moved by a first transfer distance in the second direction of transfer, which contracts the die by allowing the die parts 3, 5 to turn in an articulated manner towards each other. The die is no longer pressed against the pipe wall and the die parts 3 and 5 detach from contact with the inner wall of the pipe when the upper die part turns downwards and the spring 17 turns the lower die part 5 upwards. The die is then no longer in contact with the inner surface of the pipe when the pipe is pulled away from the punching position. The threshold 15 on the lower surface of the lower die part 5 is adapted to rest against the support bushing 14 and to keep the lower die part 5 turned upwards when the lower die part 5 and the wedge 8 are moved by a said second transfer distance. The base of the hole 16 then opens and the piece punched off from the pipe falls.

After this, the lower part 5 of the die and the wedge 8 are returned by means of the power unit 12 and the carriage 10 by the said second transfer distance towards the free end of the die, whereupon the device is ready to receive the next pipe to be perforated. The hole 16 is of the same size with the cutting punch and the hole to be made in the pipe over a certain distance and after that the hole 16 expands conically downwards, that is, in the direction of the working movement of the cutting punch 2, towards the wedge 8 and the lower die part 5.

The said first transfer distance is preferably shorter than the second transfer distance. The carriage 10 is supported by means of linear bearings 11 on a body (not shown) external to the device, to which the body 1 of the device is also attached by means of a body flange 1*a*.

The invention claimed is:

1. A method for perforating a wall of a pipe with a punch, the punch comprising a body (1), a cutting punch (2) and a three-part die (3, 5, 8) including an upper die part (3), a lower die part (5) and a wedge (8) between the upper and lower die parts (3, 5), the method comprising the following steps:

positioning the pipe in a punching position such that the die (3, 5, 8) is inside the pipe, expanding the die (3, 5, 8) in a direction of movement of the cutting punch by moving the wedge (8) in a first direction of transfer towards a free end of the die to thereby increase a distance between the upper and lower die parts (3, 5) and form an expanded die (3, 5, 8), perforating the wall of the pipe with the cutting punch (2) to thereby form a perforation including rims while supporting the wall with the expanded die (3, 5, 8) during punching, whereupon the piece punched off from the pipe falls into a hole (16) in the upper die part (3), contracting the die (3, 5, 8) by moving the wedge (8) in a second direction of transfer opposite to the first direction of transfer and away from the free end of the die, removing the perforated pipe from the punching position, and positioning the perforated pipe in a position for finishing the rims of the perforation, wherein the die (3, 5, 8) is supported by a support bushing (14) attached to the body (1), wherein the die (3, 5, 8) is kept out of contact with an inner surface of the pipe proximate to the die during the positioning of the pipe in the punching position, and the die (3, 5, 8) is brought into contact with the inner surface of the pipe during the expansion such that the upper die part is rotated upwards and the lower die part is rotated downwards as a result of the wedge being moved in the first direction of transfer, wherein after perforating the wall, the wedge (8) is moved by a first transfer distance in the second direction of transfer, which contracts the die by allowing the upper and lower die parts (3, 5) to rotate in an articulated manner towards each other, wherein when the perforated pipe is removed from the punching position, the lower part (5) of the die and the wedge (8) are then moved together by a second transfer distance in the said second direction of transfer thus exposing a base of the hole (16) in the upper die part, whereupon the piece punched off from the pipe falls out through the base of the hole (16), and wherein upon moving the lower die part (5) and the wedge (8) the second transfer distance in the second direction of transfer, the lower die part (5) is rotated upwards or supported in an upwards rotated position by supporting the lower die part of the die on the support bushing (14) by means of a notch (15) on a lower surface of the lower die part.

2. The method according to claim 1, wherein the perforation formed in the pipe is an oval hole with a round cross-section.

3. A device for perforating a pipe wall, the device comprising:

a body (1), a cutting punch (2) arranged to reciprocate with respect to the body and having the shape and size of the desired hole, an elongated die (3, 5, 8) supported on the body (1) by a support bushing (14) and having a free end, wherein the die (3, 5, 8) comprises an upper die part (3) with a hole (16) corresponding to the shape and size of the cutting punch, a lower die part (5), and a wedge (8) disposed between the upper and lower die parts, wherein the wedge can be reciprocated by a first power unit (9) to thereby expand and contract the die, wherein the upper die part (3) is attached to the support bushing (14) by a swivel joint (4) which allows rotating movement of the upper die part (3) in the direction of movement of the cutting punch (2) within a first range of movement allowed by the support bushing (14) and the wedge (8), wherein the lower die part (5) is attached to a carriage (10) moved by a second power unit (12) by a swivel joint (6) which allows rotating movement of the lower die part (5) in the direction of movement of the cutting punch (2) within a second range of movement allowed by the support bushing (14) and the wedge (8), wherein the wedge (8) has first and second wedge surfaces (8*a*, 8*b*) which rotate both die parts (3, 5) away from each other in an articulated manner to expand the die when the first power unit (9) moves the wedge (8) towards the free end of the die (3, 5, 8), wherein the first power unit (9) is adapted to move the wedge (8) in a contracting direction by a first transfer distance, and the second power unit (12) is adapted to move the lower die part (5) and the wedge (8) together by a second transfer distance which extends beyond the first transfer distance to expose a base of the hole (16) of the upper die part (3), and wherein on the lower surface of the lower die part (5) is a notch (15) adapted to rest against the support bushing (14) and to rotate the lower die part (5) upwards or to support the lower die part (5) in an upwards rotated position upon moving said second transfer distance.

4. The device according to claim 3, wherein the first power unit (9) is a piston type cylinder device, the cylinder of which is attached to the carriage (10) and a piston rod is attached to the wedge (8).

5. The device according to claim 3, wherein the second power unit (12) is a piston type cylinder device, the cylinder of which is attached to the body (1) and a piston rod is attached to the carriage (10).

6. The device according to claim 3, wherein on a lower surface of the upper die part (3) that contacts the first wedge surface slopes downwards towards the free end of the die, wherein the upper die part (3) gradually becomes thicker towards the free end of the die, and wherein an upper surface of the lower die part (5) that contacts the second wedge surface slopes upwards, wherein the lower die part (5) gradually becomes thicker towards the free end of the die.

* * * * *